(12) United States Patent
Choi et al.

(10) Patent No.: US 9,096,733 B2
(45) Date of Patent: Aug. 4, 2015

(54) PROCESS FOR PRODUCING COALESCED RUBBER MICROPARTICLES AND THEIR BLENDS WITH EPOXY RESINS

(71) Applicant: ZEON CHEMICALS L.P., Louisville, KY (US)

(72) Inventors: Soobum Choi, Louisville, KY (US); Lawrence Justice, Louisville, KY (US); James Eckler, Louisville, KY (US)

(73) Assignee: ZEON CHEMICALS L.P., Louisville, KY (US)

( * ) Notice: Subject to any disclaimer, the term of this patent is extended or adjusted under 35 U.S.C. 154(b) by 69 days.

(21) Appl. No.: 14/085,383

(22) Filed: Nov. 20, 2013

(65) Prior Publication Data
US 2015/0141576 A1    May 21, 2015

(51) Int. Cl.
C08C 1/15 (2006.01)
C08J 3/12 (2006.01)
C08J 3/00 (2006.01)

(52) U.S. Cl.
CPC ... C08J 3/12 (2013.01); C08C 1/15 (2013.01); C08J 3/005 (2013.01); *C08J 2309/04* (2013.01); *C08J 2363/00* (2013.01); *C08J 2409/04* (2013.01)

(58) Field of Classification Search
None
See application file for complete search history.

(56) References Cited

U.S. PATENT DOCUMENTS 4,043,955 A * 8/1977 Paster .......................... 523/313
4,309,331 A * 1/1982 Graham ....................... 524/561

FOREIGN PATENT DOCUMENTS

EP    1632533 A1 *  3/2006
JP    5-295237 A  * 11/1993
JP    6-107910 A  *  4/1994

* cited by examiner

*Primary Examiner* — Robert Sellers
(74) *Attorney, Agent, or Firm* — Westerman, Hattori, Daniels & Adrian, LLP

(57) ABSTRACT

Coalesced rubber particles having an average particle size of 5-50 microns are produced by:
(1) adding simultaneously to a latex of pre-crosslinked rubber particles a solvent and an electrolyte solution to form swollen rubber aggregation particles, wherein the solvent has a lower boiling point than water and a capacity of swelling the rubber by at least 10 wt %, and the electrolyte is a solution of at least one metal salt;
(2) removing the solvent under atmospheric pressure or low vacuum and at temperature greater than 80° C. to coalesce the rubber into particles having an average particle size of 5-50 50 microns;
(3) filtering and washing with methanol; and
(4) filtering the washed particles to remove methanol.
An epoxy resin is blended with the particles and residual methanol removed, to obtain a blend containing coalesced rubber particles having an average particle size of 5-50 microns in the blended state.

8 Claims, 5 Drawing Sheets

PROCESS FOR PRODUCING COALESCED RUBBER MICROPARTICLES AND THEIR BLENDS WITH EPOXY RESINS

BACKGROUND OF THE INVENTION

The present invention relates to coalesced rubber particles having an average particle size in the range of 5 microns up to and including 50 microns, and to epoxy resin blends containing these coalesced rubber particles, also known as microparticles.

There has been continued growing interest in fiber-reinforced prepreg materials for use in aerospace, automotive, sports and other high performance applications. The continuous fibers embedded in a polymer matrix provide load bearing strength to such composite materials. Epoxy resins are thermosetting matrices commonly used in prepreg materials because epoxy resins are characterized by dimensional stability, mechanical strength, electrical insulating properties, heat resistance, water resistance, and chemical resistance. However, the cured epoxy matrix in a prepreg has poor fracture toughness and is very brittle. One method of increasing the toughness of an epoxy matrix is to add a thermoplastic material or a rubber. A common toughening method is to disperse rubber modifiers through the entire epoxy matrix in a homogeneous manner.

Multilayer fiber-reinforced prepreg materials have been developed which are laminates of layers of fibers and resin. In such layered composites it is desirable for the particles of rubber modifier to be concentrated in the layers of resin separating the layers of fiber (or fiber tows) as opposed to being embedded inside the fibers, to achieve effective toughening of the resin layers and prevent delamination of the composite.

A common method for making a prepreg ply having preformed rubber particles concentrated on the surfaces of a layer of fibers is by single pass impregnation. In this method two films of particle-modified resin are formed, for example on a release sheet, and respectively applied to each side or surface of a layer of fibers or fiber tow. This ply is then subjected to a hot melt treatment with the application of pressure to impregnate the fiber tow with the resin. With the selection of appropriate conditions and materials, the rubber particles filter out through the fibers during the prepreg process and concentrate on the surfaces of the ply. This method has the advantage of being relatively simple, but may lead to problems in prepreg quality related to the distribution of the particles. The size of the rubber particles is a particularly important factor in single pass impregnation. The use of modifier particles from 1 micron to 100 microns in size has been reported for toughening the resin matrix in a prepreg, and in particular for toughening the resin interlayer between fiber tows. However, problems in prepreg quality have been reported when the modifier particles are at the lower end of this range of particle size. In particular, as the particle size is decreased and approaches the diameter of the reinforcing fibers, the particles may fail to filter out during the single pass impregnation, and instead impregnate the fiber bed. In such case, the particles are dispersed throughout the composite and the interlayer toughening effect is not achieved. As the particle size of preformed rubber particles increases in an epoxy-based multilayer prepreg, more unevenness is observed in the rubber-modified resin interlayer. The fracture toughness in this type of composite is also affected by the particle size, as well as the particle size distribution and the overall concentration of particles. (Hayes et al., Journal of Composite Materials 36: 299 (2002))

The present invention provides coalesced (preformed) rubber particles having an average particle size in the range of 5 microns up to and including 50 microns, which are particularly suitable for use as modifiers for epoxy resins in prepreg materials, including multi-layer prepregs.

Crosslinked rubber particles of about 50 microns in size are currently produced by a spray drying method. However, rubber particles of about 10-20 microns in size cannot be made readily by the spray drying method because of the risk of ignition associated with spray drying very small particles. EP 1632533 A1 discloses a process for producing an epoxy resin composition having core/shell rubber particles (0.05 to 1 micron in size) dispersed in the epoxy resin. This particle size is too small for use in multi-layer prepregs. The disclosed method could not produce particles of a selected size in the range of 5-40 microns. Other master-batch blends of modified epoxy have been proposed. JP 5-295237 A discloses a method in which a rubber-like polymer latex is coagulated, the coagulated material is dried until the moisture content is less than 15 wt % and then pulverized. The resulting powder is mixed with an epoxy resin. This method suffers from a number of drawbacks: the coagulated material tends to form a rubber sheet after the milling step because of the low glass transition temperature of the rubber; it is very difficult to obtain the desired particle size; and the residual water could not be removed readily because of the high boiling point of water. JP 6-107910 A discloses a method in which a rubber-like polymer latex is mixed with an epoxy resin, and then the water is distilled away to give a modified epoxy blend. A difficulty with this method is that a large amount of water must be removed in the presence of the epoxy resin at the risk of causing opening of the epoxy ring. It is also very difficult to obtain the desired particle size by this method. U.S. Pat. No. 4,778,851 discloses a number of methods for preparing rubber-modified epoxy resins. In one of the disclosed methods a core-shell rubber latex is mixed with an epoxy resin in the presence of an organic solvent. A major drawback of this method is that a large amount of water present in the mixture and the organic solvent must be removed, for example by distillation. The separation of the aqueous layer from the organic solvent layer takes a long time, which can be as much as a whole day, and may be hampered when the organic solvent layer and the aqueous layer form a stable emulsified or suspended state.

SUMMARY OF THE INVENTION

The invention provides a method for producing coalesced rubber particles having an average particle size in the range of 5 microns up to and including 50 microns without using spray drying, thus avoiding the risk of ignition associated with spray drying small particles. The coalesced rubber particles having an average particle size in that range are particularly suitable for preparing epoxy master-batches used in the manufacture of prepregs, notably fiber reinforced prepregs.

The coalesced rubber particles are obtained by treating a rubber latex simultaneously with a solvent to cause swelling of the rubber particles and an electrolyte solution to cause the swollen rubber particles to aggregate. The resulting aggregated swollen rubber particles are coalesced by removing the solvent under low vacuum at a high temperature, and then filtered and washed with methanol. The invention also provides a method for producing a blend of an epoxy resin with coalesced rubber particles which have an average particle size in the range of 5 microns up to and including 50 microns in the blended state.

DESCRIPTION OF THE INVENTION

Figure 1:
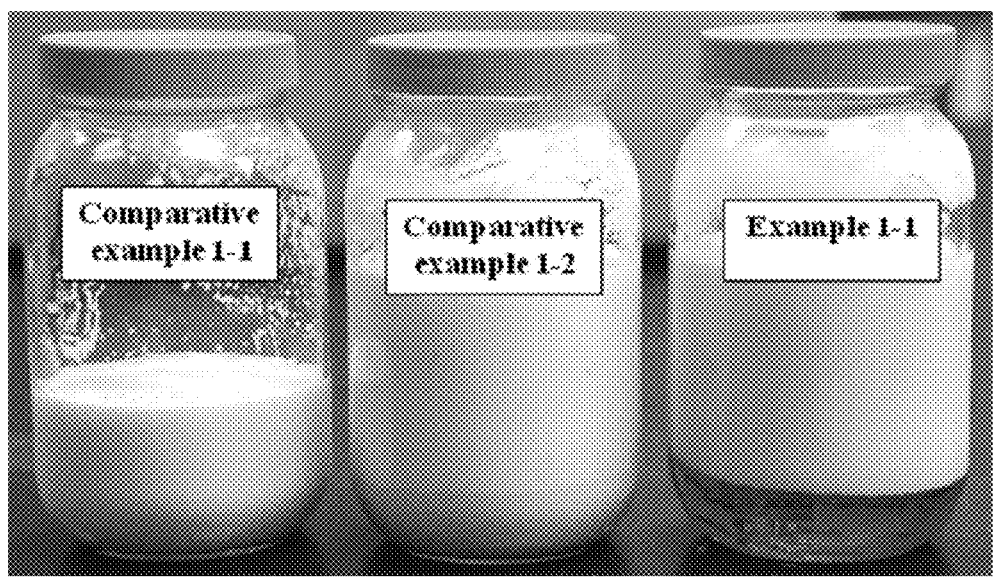
FIG. 1 is a photograph of three jars holding the products respectively obtained in Example 1-1, Comparative Example 1-1 and Comparative Example 1-2 in the treatment of an NBR latex.

In the method of the invention pre-crosslinked nano-sized rubber particles from a rubber latex are treated simultaneously with a solvent to cause swelling of the rubber particles and an electrolyte solution to cause the swollen rubber particles to aggregate. The resulting aggregated swollen rubber particles are coalesced by removing the solvent under low vacuum at a high temperature, and then filtered and washed with methanol.

More specifically the invention provides a method for producing coalesced rubber particles having a specified particle size, and a method for blending an epoxy resin with the obtained coalesced rubber particles.

The coalesced rubber particles having an average particle size in the range of 5 microns up to and including 50 microns are produced by:

(1) adding simultaneously to a latex of pre-crosslinked rubber particles a solvent and an electrolyte solution to form swollen rubber aggregation particles, wherein the solvent has a lower boiling point than water and has a capacity of swelling the rubber particles to the extent of at least 10% by weight based on the solid content of the original latex, and the electrolyte is a solution of at least one metal salt;

(2) removing the solvent under atmospheric pressure or a low vacuum of less than—250 mm Hg and at a temperature greater than 80° C. to coalesce the rubber particles into coalesced rubber particles having an average particle size in the range of 5 microns up to and including 50 microns;

(3) removing impurities by filtering the coalesced rubber particles and washing with methanol; and (4) filtering the washed coalesced rubber particles to remove the methanol and obtain coalesced rubber particles having an average particle size in the range of 5 microns up to and including 50 microns.

The rubber-epoxy blend is obtained by mixing the washed and filtered coalesced rubber particles obtained in step (4) with an epoxy resin, and drying off the residual methanol at a temperature lower than the temperature at which the epoxy resin begins to crosslink and under high vacuum to protect the epoxy group in the epoxy resin and retain the desired average particle size in the range of 5 microns up to and including 50 microns for the rubber particles in the blended state with the epoxy matrix. In the above process of preparing the coalesced rubber particles, the removal by filtration of methanol in step (4) may be carried out just before the coalesced rubber particles are blended with an epoxy resin.

The pre-crosslinked rubber latex in the present invention is not particularly limited provided that the pre-crosslinked rubber particles in the latex can be swollen by a solvent. The swelling capacity in the solvent should be at least 10% by weight based on the solid content of the original latex. If the swelling capacity is lower than 10% by weight, the size of the obtained aggregation rubber particles is too large. Non-limiting examples are pre-crosslinked particles of: acrylonitrile-butadiene copolymer (NBR); styrene-butadiene copolymer (SBR); acrylate copolymer (ACM) of at least one acrylate selected from butyl acrylate, methyl acrylate, ethyl acrylate, 2-ethylhexyl acrylate and other acrylates; hydrogenated acrylonitrile-butadiene copolymer (HNBR); butadiene homopolymer; and isoprene homopolymer or copolymer. A mixture of more than one type of pre-crosslinked rubber particles may be used, provided that the mixture has a swelling capacity of at least 10% by weight in the selected solvent or solvent mixture.

The solvent used in the method of the invention has a lower boiling point than water, and is capable of causing the pre-crosslinked rubber particles to swell by at least 10% of their weight (swelling capacity of at least 10% by weight based on the solid content of the original latex). If the boiling point of the solvent is higher than 100° C. at atmospheric pressure, this causes water to be removed before the residual solvent is removed in the step where the solvent is removed to coalesce the rubber particles. The solvent is selected based on the pre-crosslinked rubber particles. The solvent may be a mixture of more than one solvent, provided that the solvent mixture causes the crosslinked rubber particles to swell to the extent of 10% by weight. Non-limiting examples of the solvent are acetone, toluene, tetrahydrofuran, methylene chloride, chloroform, etc. Acetone is a preferred solvent for use with pre-crosslinked acrylonitrile-butadiene copolymer. The amount of solvent is in the range of 0.2 times up to and including 2.0 times by weight based on the weight of the pre-crosslinked rubber particles. If the amount of solvent is lower than 0.2 times by weight based on the weight of the pre-crosslinked rubber particles, aggregated particles of uniform size cannot be obtained readily. If the amount of solvent is higher than 2.0 times by weight based on the weight of the pre-crosslinked rubber particles, all the particles tend to gather into one cluster. The amount of solvent is selected to achieve swelling of the pre-crosslinked particles to the extent of 10% by weight based on the weight of the pre-crosslinked particles.

The electrolyte used in the method of this invention is an aqueous solution of at least one metal salt wherein the metal ion may be univalent, divalent or trivalent. Examples of univalent metal salts are sodium chloride, potassium chloride, and lithium chloride. Examples of divalent metal salts are calcium chloride, magnesium sulfate, sodium carbonate, and potassium carbonate. An example of a trivalent metal salt is aluminum sulfate. A particularly suitable electrolyte is a sodium chloride solution. The electrolyte concentration suitable for use in this invention depends on the type of electrolyte, a preferred concentration being typically 1% up to and including 10% by weight based on the electrolyte solution. The concentration of electrolyte in the total mixture including the rubber latex, the electrolyte solution and the solvent may be 0.1% up to and including 5% by weight. If the electrolyte concentration is lower than 0.1% by weight in the total mixture, it is very difficult to obtain the desired range of average particle size. If the electrolyte concentration is higher than 5% by weight in the total mixture, the rubber particles tend to form large aggregated particles (or clusters) of rubber latex which are not broken up during the coalescing process, so that coalesced particles in the desired range of average particle size cannot be obtained.

The coalesced rubber particles are obtained by removing the solvent from the mixture of swollen rubber particles under atmospheric pressure or a low vacuum of less than—250 mm Hg and at a high temperature. The solvent added in the first step should be completely removed during the coalescing step. The process of removing the solvent may also cause water to be removed. There is no limit to the amount of water thus removed, as long as the solvent is completely removed.

The coalesced rubber particles are recovered by filtration and then washed with methanol which removes most of the water from the mixture of coalesced rubber particles. The amount of methanol used for washing is not limited, but may be in the range of 0.5 times up to and including 10 times the weight of the solid content of the original latex. The coalesced rubber particles preferably are used for blending with the epoxy resin soon after being recovered by filtration from the mixture of coalesced rubber particles and methanol.

The epoxy resin suitable for use is a prepolymer having an epoxy group, also known as a polyepoxide. For ease in blending with the coalesced rubber particles, the epoxy resin should be a liquid resin or a resin which becomes fluid as the temperature is raised to the temperature used in the drying process. Non-limiting examples are a bisphenol A based epoxy resin, a novolak epoxy resin, a polyfunctional liquid epoxy resin, and diglycidyl ether of polymerized bisphenol A. An example of a bisphenol A based epoxy resin is EPON Resin 828 (difunctional bisphenol A/epichlorohydrin derived liquid epoxy resin) having a viscosity of 11,000-15,000 cP at 25° C., and available from Hexion Specialty Chemicals, Inc. Examples of polyfunctional liquid epoxy resin are Araldite MY 721 (N,N,N',N'-tetraglycidyl-4,4'-methylenebisbenzeneamine) having a viscosity of 3,000-6,000 cP at 50° C., Araldite MY 722 (N,N,N',N'-tetraglycidyl-4,4'-diamino-3,3'-diethyldiphenylmethane) having a viscosity of 8,000-12,000 cP at 25° C., and Araldite MY 0610 CH (3-glycidyloxy-N,N-diglycidylaniline triglycidyl-m-aminophenol) having a viscosity of 2,000-4,500 cP at 25° C., all available from Huntsman Advanced Materials Americas LLC. A mixture of more than one epoxy resin may be used for blending with the coalesced rubber particles.

The blend ratio of the coalesced rubber particles and the epoxy resin is in the range of 2% up to and including 30% by weight of filtered coalesced rubber particles based on the weight of the blend. If the amount of filtered coalesced rubber particles is lower than 2% by weight, the toughening effect is not satisfactory. If the amount of filtered coalesced rubber particles is higher than 30% by weight, it is very difficult to mix the filtered coalesced rubber particles with the epoxy resin during the drying process and in end-use applications.

The drying temperature is below the temperature at which the epoxy resin begins to crosslink during the drying step. For example, the drying temperature may be selected to be lower than the recommended handling temperature for the epoxy resin. The drying step is carried out under a high vacuum of less than—380 mm Hg.

The following examples further illustrate aspects of the invention but are not to be construed as limiting the scope of the invention.

Figure 2:
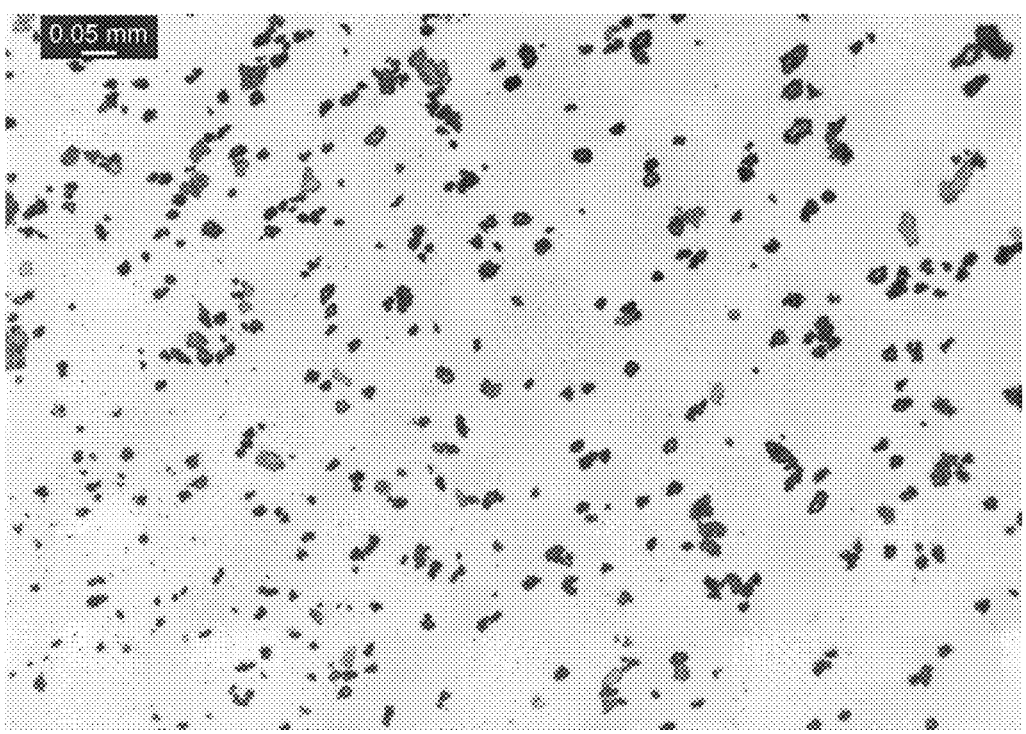
FIG. 2 is a photograph taken with an optical microscope of the coalesced NBR particles of Example 1-1 after washing with methanol.
Figure 3:
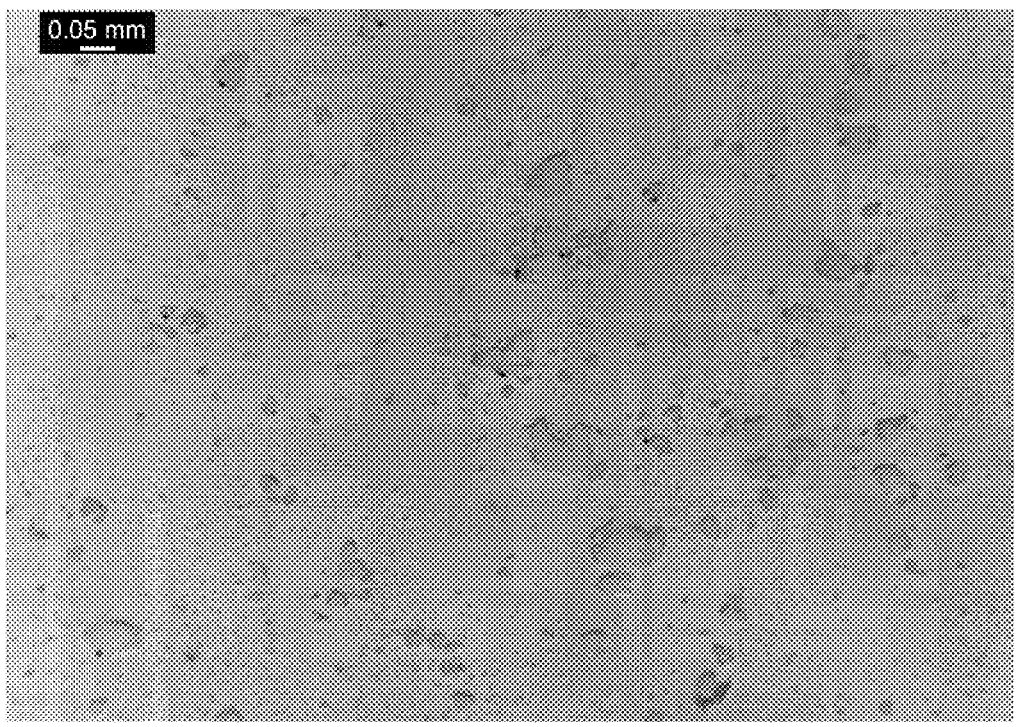
FIG. 3 is a photograph taken with an optical microscope of the master-batch of Example 1, containing 10 wt % of NBR particles and 90 wt % of Araldite MY 721 epoxy resin, after dilution with more Araldite MY 721.
Figure 4:
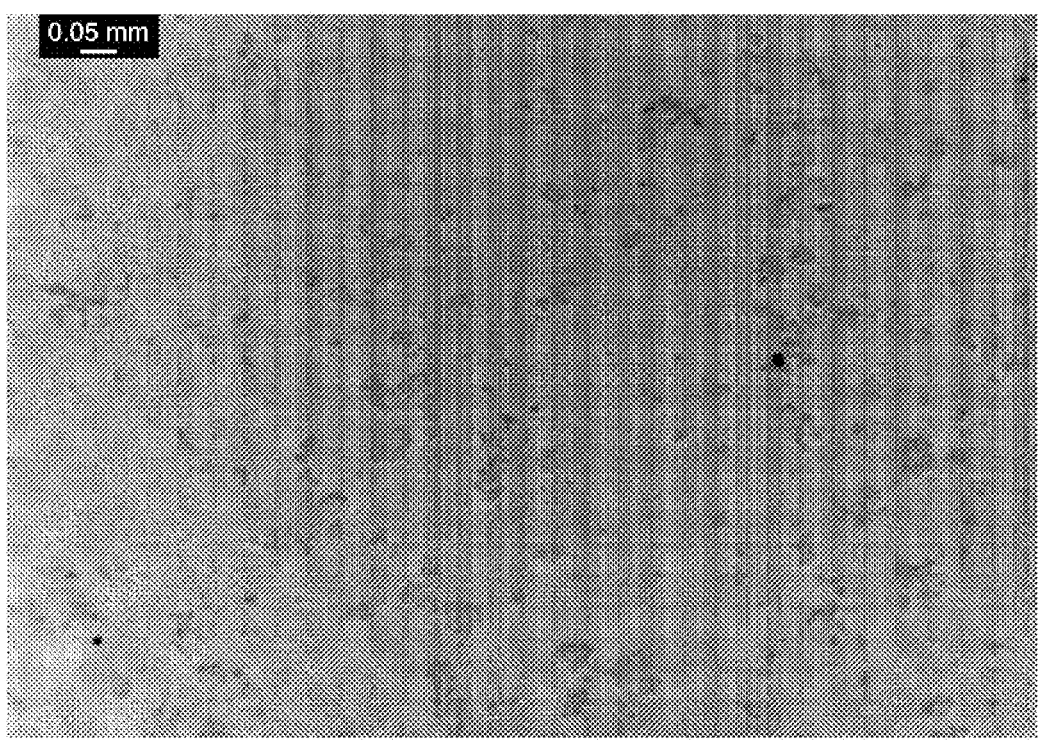
FIG. 4 is a picture taken with an optical microscope of the master-batch of Example 2, containing 15 wt % of NBR particles and 85 wt % of Araldite MY 722 epoxy resin, after dilution with more Araldite MY 722.

The photographs in FIGS. 2-4 were taken with a Leica DMS1000 Microscope equipped with a MOB311 lens (Objective Achromat 2x, WD=27 mm). The average particle sizes were calculated by subjecting the photographs to LAS Image Analysis using the equivalent circle diameter option because of the irregular shape of the particles.

Preparation of Coalesced Rubber Particles

Example 1-1

Pre-Crosslinked Rubber Latex

DP 5045 latex was used, which is a pre-crosslinked acrylonitrile-butadiene copolymer from Zeon Chemicals LP produced by emulsion polymerization. The DP 5045 latex had a solid content of 27 wt % and a glass transition temperature of −6° C. The polymer part of the DP 5045 latex was composed of 47 wt % of butadiene, 48 wt % of acrylonitrile, 2 wt % of methacrylic acid, and 3 wt % of ethylene glycol dimethacrylate. The particle size of the DP 5045 latex was 114 nm as measured with a Beckman Coulter LS Particle Size Analyzer.

Treatment of Pre-Crosslinked Rubber Latex 160 g of the DP 5045 latex was placed in a 500 ml beaker provided with a magnetic stirrer and held at room temperature. 160 g of a 4 wt % sodium chloride aqueous solution was prepared in a 250 ml beaker. Under stirring 40 g of acetone was added to the 160 g of sodium aqueous solution in the beaker and was mixed thoroughly. The obtained blend of acetone and sodium chloride aqueous solution was dropped slowly into the 160 g of DP 5045 latex in the 500 ml beaker, which resulted in the production of acetone-swollen aggregated NBR particles having a particle size in the range of 30 microns up to and including 100 microns The resulting mixture (a total of 360 g of acetone-swollen aggregated NBR particles and water) was then transferred to a 500 ml four-neck flask equipped with a vacuum line and a Dinstock separator/condenser. This mixture was heated in an oil bath up to 95° C. under low vacuum (−76 mm Hg) and maintained in the 95° C. oil bath for 5 hours. The amount of liquid removed was 72 g, which is believed to consist of the 40 g of acetone initially added with the remainder being 32 g of water. The coalesced NBR particles in the remaining water phase are shown in FIG. 1, prior to recovery of the coalesced NBR particles by filtration to remove the water.

After removal of the water by filtration, the obtained coalesced NBR particles were washed two times with excess methanol (the excess methanol forming a clear methanol phase at the top of the mixture of coalesced NBR particles and methanol) to remove residual water. The coalesced NBR particles in the methanol phase are shown in FIG. 2. The resulting coalesced NBR particles had an average particle size of 25 microns. The coalesced NBR particles in the methanol phase were filtered just before they were added to an epoxy resin, to prevent the particles from re-aggregating into larger particles due to the low glass transition temperature (−6° C.) of the acrylonitrile-butadiene (NBR) copolymer.

Comparative Example 1-1

Comparative Example 1-1 was prepared by the same procedure as in Example 1-1, except that only acetone was used, without the sodium chloride solution. The obtained NBR particles did not agglomerate completely. This product could not be filtered because most of the NBR particles remained unaggregated. The resulting product (unfiltered) is shown in FIG. 1.

Comparative Example 1-2

Comparative Example 1-2 was prepared by the same procedure as in Example 1-1, except that only the 160 g of 4 wt % of sodium chloride aqueous solution was used, without the acetone. Some aggregated NBR particles of non-uniform sizes were obtained, but a large portion of the NBR particles remained unaggregated. After filtering a few aggregated particles were recovered on the filter, but most of the particles passed through the filter and the obtained filtrate was still in the form of a latex, which is shown in FIG. 1.

Preparation of Master-Batch with Epoxy Resin

Example 1

After the mixture of coalesced NBR particles and methanol obtained in Example 1-1 was filtered, 35.2 wt % of coalesced NBR particles was obtained based on the weight of the mixture. 450 g of Araldite MY 721 (N,N,N',N'-tetraglycidyl-4,4''-methylenebisbenzeneamine having a viscosity of 3,000-6,000 cP at 50° C. (available from Huntsman Advanced Materials Americas LLC) was placed in a 1 liter flask in a water bath. The flask was attached to a vacuum line having a minimum vacuum of—500 mm Hg, and was provided with a mechanical stirrer. 150 g of the filtered NBR particles was added to the 1 liter flask holding the 450 g of Araldite MY 721. The water bath was heated up to 70-75° C. and maintained at 70-75° C. for 2 hours under low stirring to remove residual methanol. A final master-batch of NBR particles/Araldite MY 721 blend was obtained. After diluting this master-batch of NBR particles/Araldite MY 721 blend with more Araldite MY 721 to facilitate observation of the NBR particles, the particle size was measured with an optical microscope. The average NBR particle size in the Araldite MY 721 epoxy resin was 25 microns as shown in FIG. 3.

Example 2

Example 2 was prepared in the same manner as in Example 1 except that 420 g of Araldite MY 722 (N,N,N',N'-tetraglycidyl-4,4''-methylenebisbenzeneamine having a viscosity of 8,000-12,000 cP at 25° C. (available Huntsman Advanced Materials Americas LLC) and 210 g of filtered NBR particles were used instead of 450 g of Araldite MY 721 and 150 g of filtered NBR particles. A final master-batch of NBR particles/Araldite MY 722 was obtained. After diluting this master-batch with more Araldite MY 722 to facilitate observation of the NBR particles, the particle size was measured with an optical microscope. The average NBR particle size in the Araldite MY 722 epoxy resin was 22 microns as shown in FIG. 4.

Example 3

Figure 5:
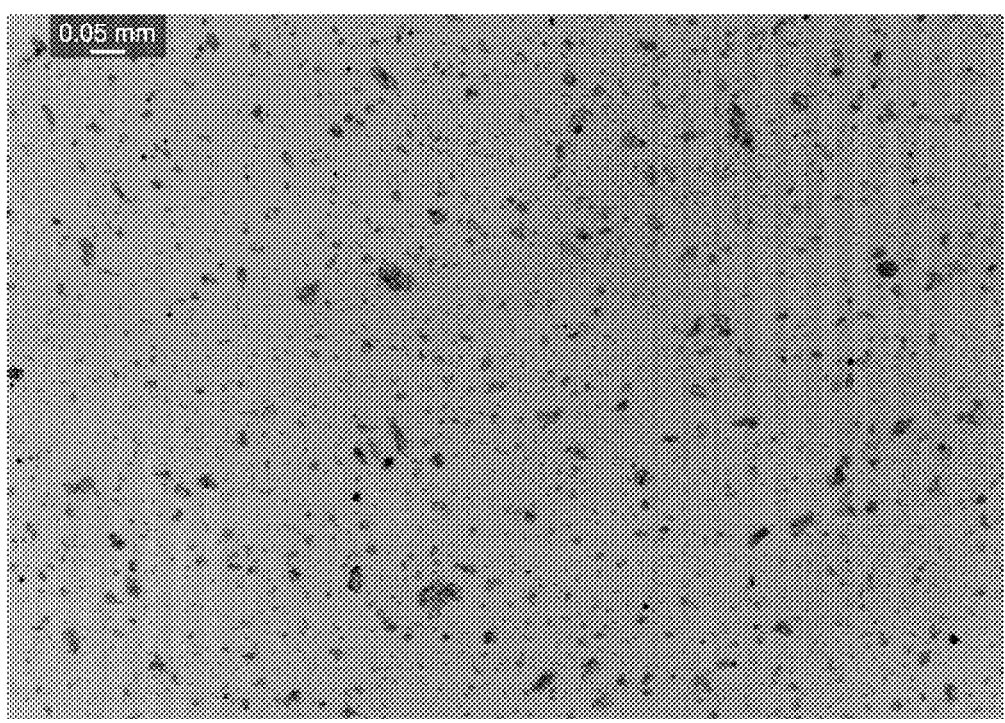
FIG. 5 is a picture taken with an optical microscope of the master-batch of Example 3, containing 15 wt % of NBR particles and 85 wt % of EPON 828 epoxy, after dilution with more EPON 828.

Example 3 was prepared in the same manner as in Example 1 except that 30 g of EPON 828 (Difunctional bisphenol A/epichlorohydrin derived liquid epoxy resin having a viscosity of 11,000-15,000 cP at 25° C. (available from Hexion Specialty Chemicals, Inc.) and 15 g of filtered NBR particles in a 250 ml flask were used instead of 450 g of MY 721 and 150 g of filtered NBR particles in a 1 liter flask. A final master-batch of NBR particles/EPON 828 was obtained. After diluting this master-batch of NBR particles/EPON 828 with more EPON 828 to facilitate observation of the NBR particles, the particle size was measured with an optical microscope. The average NBR particle size in the EPON 828 epoxy resin was 21 microns as shown in FIG. 5.

What is claimed is:

1. A process for producing coalesced rubber particles having an average particle size in the range of 5 microns up to and including 50 microns, comprising the steps of:
   (1) adding simultaneously to a latex of pre-crosslinked rubber particles a solvent and an electrolyte solution to form swollen rubber aggregation particles, wherein the latex is characterized by a solid content, the solvent has a lower boiling point than water and has a capacity of swelling the rubber particles to the extent of at least 10% by weight based on the solid content of the latex, and the electrolyte is a solution of at least one metal salt;
   (2) removing the solvent under atmospheric pressure or a low vacuum of less than—250 mm Hg and at a temperature greater than 80° C. to coalesce the rubber particles into coalesced rubber particles having an average particle size in the range of 5 microns up to and including 50 microns;
   (3) removing impurities by filtering the coalesced rubber particles and washing with methanol; and
   (4) filtering the washed coalesced rubber particles to remove the methanol and obtain coalesced rubber particles having an average particle size in the range of 5 microns up to and including 50 microns.

2. A process according to claim 1, wherein the pre-crosslinked rubber particles are selected from the group consisting of pre-crosslinked particles of acrylonitrile-butadiene copolymer (NBR), styrene-butadiene copolymer (SBR), acrylate copolymer (ACM) wherein the acrylate is at least one acrylate selected from the group consisting of butyl acrylate, methyl acrylate, ethyl acrylate, 2-ethylhexyl acrylate, and other acrylates, hydrogenated acrylonitrile-butadiene copolymer (HNBR), butadiene homopolymer, and isoprene homopolymer or copolymer.

3. A process according to claim 1, wherein the solvent is at least one selected from the group consisting of acetone, toluene, tetrahydrofuran, methylene chloride, and chloroform.

4. A process according to claim 1, wherein the amount of solvent is in the range of 0.2 times up to and including 2.0 times by weight based on the weight of the pre-crosslinked rubber particles.

5. A process according to claim 1, wherein the concentration of electrolyte is in the range of 0.1% up to and including 5% by weight based on the weight of the rubber latex, electrolyte solution and solvent.

6. A process for preparing an epoxy resin modified with coalesced rubber particles having an average particle size in the range of 5 microns up to and including 50 microns, which comprises mixing the washed and filtered rubber particles obtained by the process of claim 1 with an epoxy resin, and drying off residual methanol at a temperature lower than the temperature at which the epoxy resin begins to crosslink and under a high vacuum of less than—380 mm Hg.

7. A process according to claim 6, wherein the epoxy resin is at least one member selected from the group consisting of a liquid polymer of bisphenol A/epichlorohydrin, a polymer of N,N,N',N'-tetraglycidyl-4,4'-methylenebisbenzeneamine, a polymer of N,N,N',N'-tetraglycidyl-4,4'-diamino-3,3'-diethyldiphenylmethane, and a polymer of 3-glycidyloxy-N,N-diglycidylaniline triglycidyl-m-aminophenol.

8. A process according to claim 6, wherein the blend ratio of the coalesced rubber particles and the epoxy resin is in the range of 2% up to and including 30% by weight of coalesced rubber particles based on the weight of the blend.

* * * * *